US008108011B2

(12) United States Patent
Sudo

(10) Patent No.: US 8,108,011 B2
(45) Date of Patent: Jan. 31, 2012

(54) SIGNAL CORRECTION DEVICE

(75) Inventor: Takashi Sudo, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 12/548,714

(22) Filed: Aug. 27, 2009

(65) Prior Publication Data

US 2010/0056063 A1 Mar. 4, 2010

(30) Foreign Application Priority Data

Aug. 29, 2008 (JP) ................................ P2008-222700

(51) Int. Cl.
*H04B 1/38* (2006.01)

(52) U.S. Cl. ..... 455/570; 455/63.1; 375/240; 379/406.1

(58) Field of Classification Search ................. 455/63.1, 455/570; 704/204, 226, 500, 205; 375/240; 379/406.1
See application file for complete search history.

(56) References Cited

U.S. PATENT DOCUMENTS

| | | | | |
|---|---|---|---|---|
| 5,355,431 | A * | 10/1994 | Kane et al. | 704/226 |
| 5,706,394 | A * | 1/1998 | Wynn | 704/219 |
| 5,839,101 | A * | 11/1998 | Vahatalo et al. | 704/226 |
| 5,953,381 | A * | 9/1999 | Tsukahara | 375/346 |
| 6,549,586 | B2 * | 4/2003 | Gustafsson et al. | 375/285 |
| 7,706,550 | B2 | 4/2010 | Amada et al. | |
| 2007/0058799 | A1 * | 3/2007 | Sudo | 379/406.01 |
| 2008/0010063 | A1 | 1/2008 | Komamura | |
| 2008/0130907 | A1 * | 6/2008 | Sudo et al. | 381/66 |
| 2010/0010808 | A1 | 1/2010 | Sugiyama et al. | |

FOREIGN PATENT DOCUMENTS

| | | | |
|---|---|---|---|
| JP | 3522986 | A | 6/1997 |
| JP | 10-254499 | A | 9/1998 |
| JP | 2003-514264 | A | 4/2003 |
| JP | 2005-195955 | A1 | 7/2005 |
| WO | WO 01/37254 | | 5/2001 |
| WO | WO 2006/070560 | A1 | 7/2006 |
| WO | WO 2007/026691 | A1 | 3/2007 |

OTHER PUBLICATIONS

Japanese Office Action dated Jul. 23, 2010, issued in counterpart Japanese Application No. 2008-222700, and English translation of the Japanese Office Action.

* cited by examiner

*Primary Examiner* — Edward Urban
*Assistant Examiner* — Ganiyu Hanidu
(74) *Attorney, Agent, or Firm* — Holtz, Holtz, Goodman & Chick, P.C.

(57) ABSTRACT

A signal correction device including: an orthogonal transform section configured to perform an orthogonal transform for an input signal that includes a speech as a target signal and an unnecessary non-target signal; an interval determining section configured to determine whether each frame of the input signal is an interval in which the non-target signal is dominantly included; a suppressing gain calculating section configured to calculate suppressing gain for suppressing the non-target signal for each first frequency band width for a frame determined to be the interval, and to calculate suppressing gain for suppressing the non-target signal for each second frequency bandwidth for a frame determined not to be the interval; and a signal correcting section configured to perform a signal correcting process for suppressing the non-target signal for a transform coefficient acquired by the orthogonal transform section by using the suppressing gain.

20 Claims, 7 Drawing Sheets

SIGNAL CORRECTION DEVICE

CROSS-REFERENCE TO RELATED APPLICATIONS

The entire disclosure of Japanese Patent Application No. 2008-222700 filed on Aug. 29, 2008, including specification, claims, drawings and abstract is incorporated herein by reference in its entirety.

BACKGROUND

1. Field of the Invention

One aspect of the invention relates to a signal correction device.

2. Description of the Related Art

In apparatuses such as cellular phones or personal computers that perform speech input and output, noise suppressing process for suppressing noise included in the input speech or echo suppressing process for suppressing echo that is generated due to the return of sound from a speaker to a microphone are performed. In the process for suppressing the noise or the echo, various techniques have been proposed (see Japanese Patent No. 3522986, for instance).

In the invention disclosed in Japanese Patent No. 3522986, an orthogonal transform is performed for an input signal, and transform coefficients acquired by performing the orthogonal transform are divided into two groups including a transform coefficient group in which the transform coefficients are included in a lower band than a specific fixed frequency that is determined in consideration of a frequency corresponding to the pitch period of the speech and a transform coefficients group in which the transform coefficients are included in a higher band than the specific fixed frequency. Then, a suppression process is performed for the transform coefficient group in which the transform coefficients are included in the higher band by using suppressing gain (ratio) different for each transform coefficient. On the other hand, the suppression process is performed for the transform coefficient group in which the transform coefficients are included in the lower band by using constant suppressing gain (ratio). Accordingly, even when an orthogonal transform means of a low order number that has a frame length smaller than the pitch period of the speech is used, a distortion is not generated in the speech after noise suppression. Therefore, the computational load relating to the orthogonal transform is light, and degradation of the speech quality does not occur.

However, in a case where the suppression process is performed by using constant suppressing gain (ratio) for a plurality of frequency bands, when the number of the transform coefficient groups (the number of the frequency bands) for which constant suppressing gain (ratio) is used in the same group is too small, rasping musical noise is generated in an interval in which a noise as a non-target signal is included in the input signal. On the other hand, in such a case, when the number of the transform coefficient groups (the number of the frequency bands) for which the constant suppressing gain (ratio) is used in the same group is too large, the distortion of the speech in a speech interval in which a small noise is included may easily increase. Such a problem occurs not only in the noise suppressing process but also in the echo suppressing process. Thus, in a case where echo as an unnecessary non-target signal is inserted into the input signal, when the number of the frequency bands for which a constant ratio is used in the same group is too small, a rasping sound is generated. On the other hand, in such a case, when the number of the frequency bands for which the constant ratio is used in the same group is large, the distortion of the speech increases in an interval in which a small echo is included.

In the invention disclosed in Japanese Patent No. 3522986, the method of dividing the groups is not dynamically changed in accordance with the input signal. Accordingly, even when the noise suppressing process is performed by grouping the transform coefficients that have similar frequency characteristics after the orthogonal transform is performed, a sound which irritates the ear is generated or distortion of the speech increases as described above, depending on the number of the frequency bands for which the constant ratio is used in the same group.

SUMMARY

According to an aspect of the invention, there is provided a signal correction device including: an orthogonal transform section configured to perform an orthogonal transform for an input signal, the input signal including a speech as a target signal and an unnecessary non-target signal other than the speech; an interval determining section configured to determine whether each frame of the input signal is an interval in which the non-target signal is dominantly included; a suppressing gain calculating section configured to calculate suppressing gain for suppressing the non-target signal for each first frequency bandwidth for a frame determined to be the interval, and to calculate suppressing gain for suppressing the non-target signal for each second frequency band width for a frame determined not to be the interval; and a signal correcting section configured to perform a signal correcting process for suppressing the non-target signal for a transform coefficient that is acquired by the orthogonal transform section by using the suppressing gain that is calculated by the suppressing gain calculating section.

BRIEF DESCRIPTION OF THE DRAWINGS

Embodiment may be described in detail with reference to the accompanying drawings, in which.

DETAILED DESCRIPTION OF THE EMBODIMENTS

Hereinafter, exemplary embodiments of the invention will be described with reference to the accompanying drawings.

First Embodiment

Figure 1:
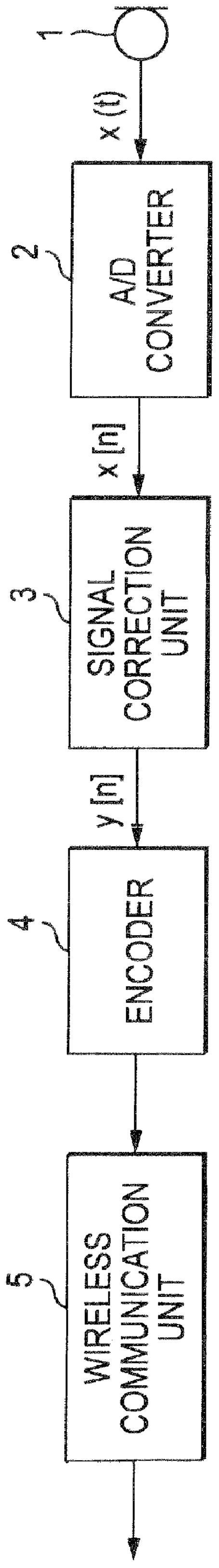
FIG. 1 is an exemplary block diagram representing configuration of a transmitter of a wireless communication device of a cellular phone in which a signal correction device according to a first embodiment of the invention is used.

FIG. 1 represents the configuration of a transmitter system of a wireless communication device of a cellular phone in which a signal correction device according to the first embodiment is used. The wireless communication device represented in this figure includes a microphone 1, an A/D converter 2, a signal correction unit 3, an encoder 4, and a wireless communication unit 5.

The microphone 1 collects surrounding sound and outputs the collected sound as an analog signal x(t). At this moment, other than a speech signal s(t) as a target signal, a noise component that is, the surrounding environmental noise, is mixed with the speech signal s (t) so as to be also collected as the signal x(t) from the microphone 1. Hereinafter, an unnecessary signal other than the target signal such as the noise component is referred to as a non-target signal. The A/D converter 2 performs A/D conversion for the analog signal x(t), which is output from the microphone 1, for each predetermined processing unit with the sampling frequency set to 8 kHz and outputs digital signals x[n] (n=0, 1, . . . , N−1) for each frame (N samples). Hereinafter, it is assumed that one frame is formed of samples of N=160. The signal correction unit 3 corrects an input signal such that only a target signal is enhanced or a non-target signal is suppressed and outputs a signal y[n] after the correction. For example, in such a case, a noise suppressing process for the input signal may be considered as the correction process. A detailed process of the signal correction unit 3 will be described later. The encoder 4 encodes the signal y[n] after correction that is output from the signal correction unit 3 and outputs the encoded signal to the wireless communication unit 5. The wireless communication unit 5 includes an antenna and the like. By performing wireless communication with a wireless base station not shown in the figure, the wireless communication unit 5 sets up a communication link between a communication counterpart and the wireless communication device through a mobile communication network for communication and transmits the signal that is output from the encoder 4 to the communication counterpart.

In addition, here, a configuration in which the signal that is output from the encoder 4 is described to be transmitted by the wireless communication unit 5. However, a configuration in which a memory means such as a memory, a hard disk, or the like is arranged, and the signal output from the encoder 4 is stored in the memory means may be used. Furthermore, a configuration in which a signal received through wireless communication or a signal stored in the memory means in advance is decoded, and then, a signal acquired by performing a noise suppressing process for the decoded signal is converted from digital to analog and is output from a speaker may be used.

Figure 2:
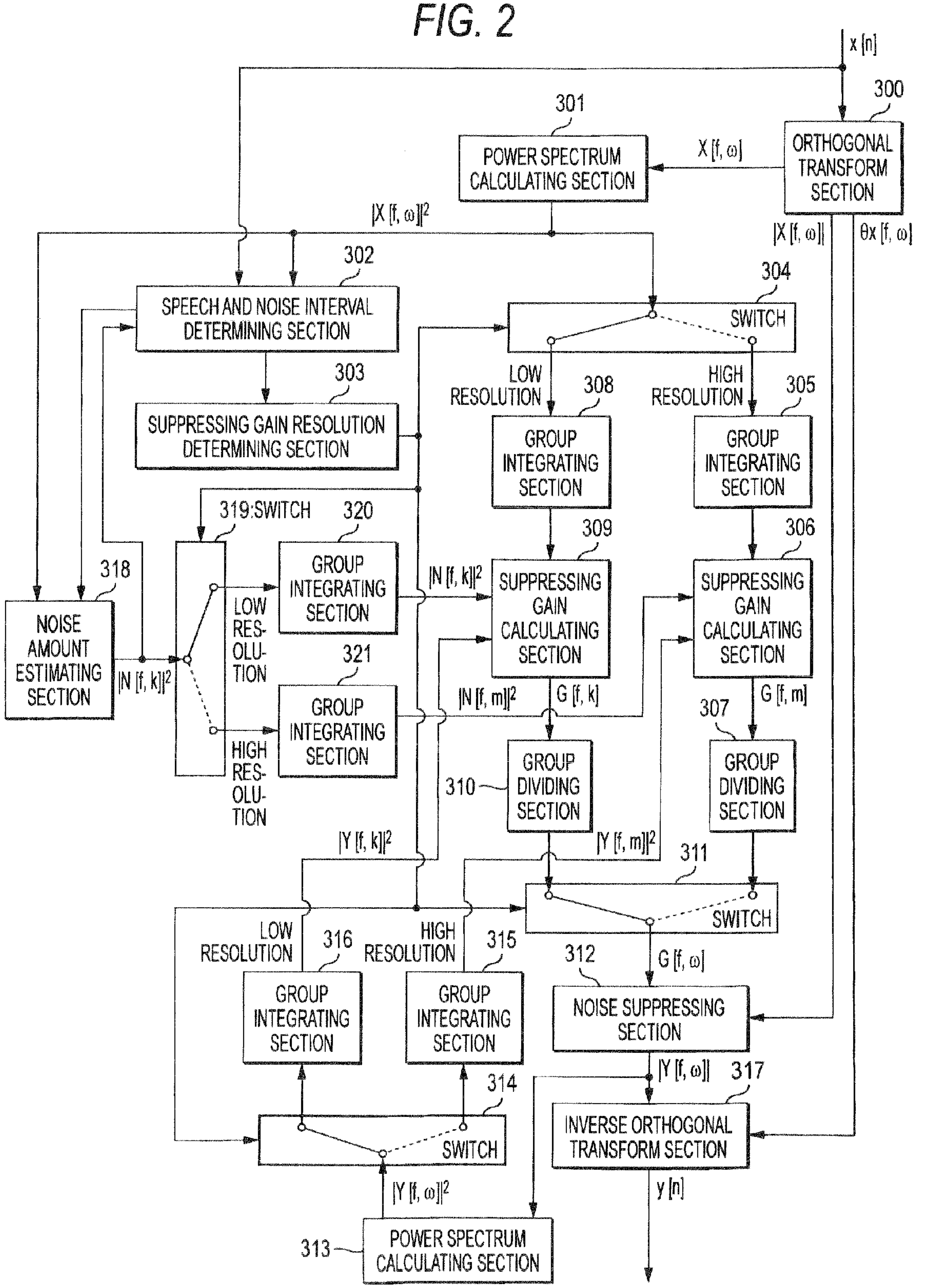
FIG. 2 is an exemplary block diagram representing configuration of a signal correction unit of the signal correction device according to the first embodiment of the invention.

Next, the signal correction unit 3 will be described. The signal correction unit 3 according to this embodiment is described to perform a noise suppressing process. The signal correction unit 3 receives a digitalized speech signal x[n] as input and outputs a digital signal y[n] after the noise suppression. FIG. 2 is a block diagram representing the configuration of the signal correction unit 3 that performs the noise suppressing process.

An orthogonal transform section 300 extracts signals corresponding to samples needed for orthogonal transform from an input signal of a previous frame f−1 and the input signal x[n] of the current frame f by appropriately performing zero padding or the like and performs windowing for the extracted signals by using a hamming window or the like. Then, the orthogonal transform section 300 performs orthogonal transform by using a technique such as Fast Fourier Transform (FFT) and outputs the frequency spectrum X[f, ω] for the input signal. Here, the window function that is used for the windowing is not limited to the hamming window function. Thus, a different symmetrical window (a Hanning window, a Blackman window, or a sine window, or the like) or an asymmetrical window such as a window that is used in a speech encoding process may be appropriately used. In addition, the overlap that is a ratio of the shift width of an input signal x[n] of the next frame to the data length of the input signal x[n] is not limited to 50%. Here, as an example, by setting the number of samples of the overlap with the next frame to M=48, 256 samples are prepared from M samples of the input signal of the previous frame, N=160 samples of the input signal x[n] of the current frame, and zero paddings corresponding to M samples. The windowing for the 256 samples is performed by multiplying x[n] by a window function w[n] by using a sine window represented in Expression 1. Then, the orthogonal transform section 300 performs orthogonal transform by using FFT.

[Expression 1]

$$w[n] = \sin^2\left\{\frac{(n+0.5)\pi}{2M}\right\} \qquad (n = 0, \ldots, M-1)$$

$$w[n] = 1 \qquad (n = M, \ldots, N-1)$$

$$w[n] = \left[1 - \sin^2\left\{\frac{(n-N+0.5)\pi}{2M}\right\}\right] \qquad \begin{pmatrix} n = N, \ldots, \\ N+M-1 \end{pmatrix}$$

$$w[n] = 0 \qquad \begin{pmatrix} n = N+M, \ldots, \\ N+2M-1 \end{pmatrix}$$

In addition, the orthogonal transform section 300 performs the orthogonal transform by using a 256-point FFT method, and the input signal is a real signal. Thus, when the redundant 128-th bin is excluded, the frequency spectrum X[f, ω] (ω=0, 1, . . . , 127) is acquired. The orthogonal transform section 300 outputs the frequency spectrum X[f, ω], an amplitude spectrum |X[f, ω]|(ω=0, 1, . . . , 127), and a phase spectrum θx[f, ω]|(ω=0, 1, . . . , 127). In addition, the 127-th bin is originally redundant for a real signal, and the frequency bin ω=128 at the highest frequency band must be considered. However, here, there is a premise that the input signal is a signal including speech of which the band is limited. Accordingly, even when the frequency bin ω=128 at the highest frequency band is not considered, there is no influence on the sound quality due to the limitation of the frequency band. Hereinafter, for the simplification of description, the frequency bin ω=128 at the highest frequency band is not considered. However, it is apparent that the frequency bin ω=128 at the highest frequency band may be configured to be considered. In such a case, the frequency bin ω=128 at the highest frequency band is treated to be equivalent to ω=127 or to be independently.

The orthogonal transform section 300 may be configured to use a Discrete Fourier Transform (DFT), a Discrete Cosine Transform (DCT), a Walsh Hadamard Transform (WHT), a Harr Transform (HT), a Slant Transform (SLT), a Karhunen Loeve Transform (KLT), an orthogonal discrete wavelet transform, or the like other than the FFT as the orthogonal transform used for transform into the frequency domain for frequency analysis.

A power spectrum calculating section 301 calculates the power spectrum $|X[f, \omega]|^2$ ($\omega$=0, 1, . . . , 127) from the frequency spectrum X[f, ω] that is output from the orthogonal transform section 300 and outputs the calculated power spectrum.

A speech and noise interval determining section 302 determines whether an input signal x [n] for each one input frame is in an interval (noise interval) in which a noise component as a non-target signal is dominantly included or in a different interval, that is, an interval (speech interval) in which a speech signal as a target signal and a noise component as a non-target signal are mixed together. Then the speech and noise interval determining section 302 outputs information indicating the result of the determination. Hereinafter, a case where only a component exists or a component much more than the other component is included is represented by "dominantly included" or "a dominant interval". On the other hand, the other case is represented by "not dominated" or "a non-dominant interval".

In the process of the speech and noise interval determining section 302, each one frame is determined to be either the speech interval or the noise interval by using the input signal x[n] the power spectrum $|X[f, \omega]|^2$, and the noise amount $|N[f-1, \omega]|^2$ of each band of a previous frame which is output from a noise amount estimating section 318 to be described later. In particular, the speech and noise interval determining section 302, first, calculates a first-order autocorrelation coefficient that is normalized in accordance with a zero-order correlation coefficient of the input signal x[n] and calculates an average value of the normalized first-order autocorrelation coefficients with being computed as an auto-regressive model using leakage coefficients in the time direction. Then, the speech and noise interval determining section 302 determines whether the calculated average value is larger than 0.5. Next, the speech and noise interval determining section 302 determines the degree (for example, 5 dB) of a difference between the power spectrum $|X[f, \omega]|^2$ for each band and the noise amount $|N[f-1, \omega]|^2$ for each band of the previous frame. Then, the speech and noise interval determining section 302 counts the number of bands B in which the differences consecutively increase in the adjacent bands and keeps a maximum number $B_{MAX}$ of the numbers B of the bands during the same frame. When the average value of the normalized first-order autocorrelation coefficients is equal to or smaller than 0.5 and $B_{MAX}$ is equal to or larger than "1", the frame is determined to be an interval (the noise interval) in which a noise component as the non-target signal is dominantly included. On the other hand, when the average value of the normalized first-order autocorrelation coefficient is larger than 0.5 and $B_{MAX}$ is "0", the frame is determined to be an interval (the speech interval) in which a speech signal as the target signal and a noise component as the non-target signal are mixed together.

In addition, in the process of the speech and noise interval determining section 302, for example, either the speech interval or the noise interval may be determined for each one frame by using the input signal x[n] and the power spectrum $|X[f, \omega]|^2$ by using a technique that has been described in a noise canceller defined as an option in "Enhanced Variable Rate Codec, Speech Service Option 3 for Wideband Spread Spectrum Digital System" (TIAIS127) that is, a variable rate speech encoding standardized in the U.S.A., a technique that has been described in the Japanese Unexamined Patent Application No. 2001-344000, or a technique that has been described in Fruta, Takahashi, and Nakajima, "A Study of Noise Suppression Method Based on Mutual Control of Spectral Subtraction and Spectral Amplitude Suppression", The transactions of the Institute of Electronics, Information and Communication Engineers (D-II), Vol. J87-D-II, No. 2, pp. 464-474, February 2004. However, the technique used for the determination is not limited thereto. In the above-described examples, there are descriptions in which determination on the intervals of the speech and noise is made into two or more classifications. However, when the above-described examples are applied to this embodiment, a threshold value is appropriately set for classifying the frames into two. In other words, all the frames are necessarily classified either into the speech interval or the noise interval.

A suppressing gain resolution determining section 303 shifts switches 304, 311, 314, and 319 in accordance with whether the frame is the speech interval or the noise interval by using the output of the speech and noise interval determining section 302. In other words, the switches 304, 311, 314, and 319 are controlled to operate in association with one another by the suppressing gain resolution determining section 303. When the output of the speech and noise interval determining section 302 indicates the noise interval, a group integrating section 308 operates in accordance with the shift of the switch 304, a group dividing section 310 operates in accordance with the shift of the switch 311, a group integrating section 316 operates in accordance with the shift of the switch 314, and a group integrating section 320 operates in accordance with the shift of the switch 319. On the other hand, when the output of the speech and noise interval determining section 302 indicates the speech interval, a group integrating section 305 operates in accordance with the shift of the switch 304, a group dividing section 307 operates in accordance with the shift of the switch 311, a group integrating section 315 operates in accordance with the shift of the switch 314, and a group integrating section 321 operates in accordance with the shift of the switch 319.

Either the group integrating section 305 or the group integrating section 308 operates in accordance with the shift of the switch 304 for performing a process for binding the power spectrums $|X[f, \omega]|^2$ of the input signals, which are output from the power spectrum calculating section 301, such that one group is formed for each of the frequency bins corresponding to a predetermined number. However, the number of bins grouped into one group by the group integrating section 305 is different from that grouped into one group by the group integrating section 308. The number of bins grouped into one group by the group integrating section 305 is smaller than the group integrating section 308, and the number of groups grouped by the group integrating section 305 is larger than the group integrating section 308 (hereinafter, this state is referred to as "the frequency resolution is high"). On the other hand, the number of bins grouped into one group by the group integrating section 308 is larger than the group integrating section 305, and the number of groups grouped by the group integrating section 308 is smaller than the group integrating section 305 (hereinafter, this state is referred to as "the frequency resolution is low"). In examples described below, the number of bins that are grouped into one group is fixed. However, the number of bins that are grouped into one group may be configured to be changed depending on the frequency by using a Bark scale or the like, so that the number of bins grouped into one group is relatively small in a lower range, and the number of bins grouped into one group is relatively large in a higher range.

For example, in a case where the power spectrums $|X[f, \omega]|^2$ ($\omega$=0, 1, . . . , 127) of the input signals are grouped into 64 groups by the group integrating section 305 and are grouped into 16 groups by the group integrating section 308, the group integrating section 305 generates the power spectrum $|X[f, m]|^2$ (m=0, 1, . . . , 63) formed of 64 groups each including 2 bins, and the group integrating section 308 generates the power spectrum $|X[f, k]|^2$ (k=0, 1, . . . , 15) formed of 16 groups each including 8 bins. When a plurality of bins is grouped into one group by the group integrating section 305 or 308, the group integrating section sets the result acquired by averaging the power spectrums $|X[f, \omega]|^2$ of the bins that are grouped into one group as a power spectrum for each group and outputs the power spectrum as a representative value.

The noise amount estimating section 318 estimates the noise amount $|N[f, \omega]|^2$ for each band by using information, which is output from the speech and noise interval determining section 302, indicating the speech interval or the noise interval and the power spectrum $|X[f, \omega]|^2$ of the speech signal that is output from the power spectrum calculating section 301. In particular, an average power spectrum is calculated by having the power spectrum $|X[f, \omega]|^2$ of a frame, which is determined to be the noise interval, to be computed as an auto-regressive model using leakage coefficients in units of frames and outputs the average power spectrum as the noise amount $|N[f, \omega]|^2$ of each band. In particular, the noise amount $|N[f, \omega]|^2$ is calculated from Expression 2 by using |N[f−1, ω]|2 as the noise amount for each band of the previous frame and using about 0.75 to 0.95 as a leakage coefficient $_{\alpha N}[\omega]$.

$$|N[f,\omega]|^2=\alpha_N[\omega]\cdot|N[f-1,\omega]|^2+(1-\alpha_N[\omega])\cdot|X[f,\omega]|^2 \quad \text{[Expression 2]}$$

Either the group integrating section 320 or the group integrating section 321 operates in accordance with the shift of the switch 319. Both the group integrating sections 320 and 321 perform a process for grouping the noise amounts $|N[f, \omega)]|^2$, which are output from the noise amount estimating section 318, into one group for each of the frequency bins corresponding to a predetermined number. However, the number of frequency bins grouped into one group by the group integrating section 320 is different from that grouped into one group by the group integrating section 321. The group integrating section 320 groups each of bins, the number of which is the same as that in the group integrating section 308 that integrates the power spectrums of the input signals at a low resolution. On the other hand, the group integrating section 321 groups each of the bins, the number of which is the same as that in the group integrating section 305 that integrates the power spectrums of the input signals at a high resolution. For example, the group integrating section 320 calculates the noise amounts $|N[f, k]|^2$ (k=0, 1, . . . , 15) of bands of 16 groups by grouping the noise amounts $|N[f, \omega]|^2$ (ω=0, 1, . . . , 127) of each band for every 8 bins. On the other hand, the group integrating section 321 outputs the noise amounts $|N[f, m]|^2$ (m=0, 1, . . . , 63) of bands of 64 groups by grouping 2 bins of the noise amounts $|N[f, \omega]|^2$ (ω=0, 1, . . . , 127) of each band as one group.

Both a suppressing gain calculating section 306 and a suppressing gain calculating section 309 calculate suppressing gains that are used for a noise suppressing process. In addition, the suppressing gain calculating sections 306 and 309 perform a suppressing gain calculating process only for a path that is controlled by the suppressing gain resolution determining section 303. In other words, when the output of the speech and noise interval determining section 302 indicates a speech interval, the suppressing gain calculating process is performed by the suppressing gain calculating section 306.

On the other hand, when the output of the speech and noise interval determining section 302 indicates a noise interval, the suppressing gain calculating process is performed by the suppressing gain calculating section 309. However, the suppressing gain calculating section 306 performs the suppressing gain calculating process for high resolution, and the suppressing gain calculating section 309 performs the suppressing gain calculating process for low resolution.

The suppressing gain calculating section 306 calculates the suppressing gains G[f, m] of bands corresponding to the number of set groups by using high-resolution power spectrum $|X[f, m]|^2$ of the input signal that is output from the group integrating section 305 and the high-resolution noise amount $|N[f, m]|^2$ that is output from the group integrating section 321. For example, the calculation of the suppressing gain G[f, m] is performed by using one of the following algorithms or a combination thereof. In other words, a spectral subtraction method (S. F. Boll, "Suppression of acoustic noise in speech using spectral subtraction", IEEE Trans. Acoustics, Speech, and Signal Processing, vol. ASSP-29, pp. 113-120, 1979.) that is used in a general noise canceller, a Wiener Filter method (J. S. Lim. A. V. Oppenheim, "Enhancement and bandwidth compression of noisy speech", Proc. IEEE Vol. 67. No. 12, pp. 1586-1604, December 1979.), a maximum likelihood method (R. J. McAulay, M. L. Malpass, "Speech enhancement using a soft-decision noise suppression filter", IEEE Trans. on Acoustics, Speech, and Signal Processing, vol. ASSP-28, no. 2. pp. 137-145, April 1980.), or the like may be used. Here, as an example, the Wiener Filter method is used. In addition, by denoting R[·] as half-wave rectification and using the power spectrum $|Y[f-1, m]|^2$ of the noise-suppressed signal of the previous frame that is output from a group integrating section 315 to be described later, the $SNR_{PRIO}$[f, m] with respect to the prior-SNR (signal-to-noise ratio) and the $SNR_{POST}$[f, m] with respect to the post-SNR are acquired by using the following Expression 3 and Expression 4, and the suppressing gain G[f, m] is calculated by using the following Expression 5.

Here, μ[m] is a leakage coefficient in the range of about 0.9 to 0.999.

$$SNR_{POST}[f,m]=\frac{|X[f,m]|^2}{|N[f,m]|^2} \quad \text{[Expression 3]}$$

$$SNR_{PRIO}[f,m]=(1-\mu[m])\cdot R[SNR_{POST}[f,m]-1]+\mu[m]\cdot\frac{|Y[f-1,m]|^2}{|N[f,m]|^2} \quad \text{[Expression 4]}$$

$$G[f,m]=\frac{SNR_{PRIO}[f,m]}{SNR_{PRIO}[f,m]+1} \quad \text{[Expression 5]}$$

In addition, in order to prevent degradation of the sound quality by excessively suppressing the noise component and prevent intermittent suppression of the background noise, the suppressing gain G[f, m] calculating section 306 may be controlled so as not to be equal to or smaller than a predetermined lower limit by having the condition 0.252≦G[f, m]≦1.0 to be satisfied in controlling the suppressing gain G[f, m] to be not equal to or smaller than −12 dB, or the like.

On the other hand, the suppressing gain calculating section 309 calculates the suppressing gains G[f, k] of bands corresponding to the number of set groups by using the low-resolution power spectrum $|X[f, k]|^2$ of the input signal that is output from the group integrating section 308, the low-resolution noise amount $|N[f, k]|^2$ that is output from the group integrating section 320, and the power spectrum $|Y[f-1, k]|^2$ of the noise-suppressed signal, which is output from the group integrating section 316 to be described later, of the previous frame. The process performed by the suppressing gain calculating section 309 is the same as that performed by the suppressing gain calculating section 306, and thus, a detailed description thereof is omitted here.

The group dividing sections 307 and 310 restores the frequency bins that have been grouped by the group integrating section 305 or the group integrating section 308 to the number of bins before being grouped. For example, in a case where 16 groups are generated by grouping 128 bins into groups of 8 bins by using the low-resolution group integrating section 308, the group dividing section 310 copies 8 samples of the suppressing gains G[f, k], which are output from the suppressing gain calculating section 309, within the same group and divides grouping of 16 groups, whereby generating suppressing gains G[f, ω] corresponding to 128 bins. The high-resolution group dividing section 307 also can acquire the suppressing gains G[f, ω] that are restored to the number of bins before being grouped by performing the same process as that of the low-resolution group dividing section 310. Accordingly, the suppressing gain G[f, ω], which has been output by the group dividing section 307 or 310, is input to the noise suppressing section 312 through the switch 311.

The noise suppressing section 312 calculates the amplitude spectrum |Y[f, ω]| of the noise-suppressed signal by receiving the amplitude spectrum |X[f, ω] of the input signal that is output from the orthogonal transform section 300 and the suppressing gain G [f, ω] that is output from the group dividing section 307 or 310 through the switch 311 as input. The amplitude spectrum of the noise-suppressed signal |Y[f, ω]| can be represented by multiplying the amplitude spectrum |X[f, ω]| before the noise suppression by the suppressing gain G[f, ω] as $|Y[f, \omega]|=|X[f, \omega]|\cdot G[f, \omega]$.

A power spectrum calculating section 313 calculates the power spectrum $|Y[f, \omega]|^2$ (ω=0, 1, . . . , 127) of the noise-suppressed signal from the amplitude spectrum |Y[f, ω] of the noise-suppressed signal that is output from the noise suppressing section 312 and outputs the power spectrum $|Y[f, \omega]|^2$.

Either the group integrating section 315 or the group integrating section 316 operates in accordance with the shift of the switch 314. Both the group integrating sections 315 and 316 perform a process for grouping the power spectrums $|Y[f, \omega]|^2$ of the noise-suppressed signals, which are output from the power spectrum calculating section 313, into one group for each of the frequency bins corresponding to a predetermined number. However, the number of frequency bins grouped into one group by the group integrating section 315 is different from that grouped into one group by the group integrating section 316. The group integrating section 316 groups each of bins, the number of which is the same as that in the group integrating section 308 that integrates the power spectrums of the input signals, with a low resolution. On the other hand, the group integrating section 315 groups each of the bins, the number of which is the same as that in the group integrating section 305 that integrates the power spectrums of the input signals, with a high resolution. For example, the group integrating section 316 calculates the power spectrums $|Y[f, \omega]|^2$ (k=0, 1, . . . , 15) of the noise-suppressed signals of bands of 16 groups by grouping the power spectrums $|Y[f, \omega]|^2$ (ω=0, 1, . . . , 127) of the noise-suppressed signals of each band for every 8 bins. On the other hand, the group integrating section 315 outputs the power spectrums $|Y[f, m]|^2$ (m=0, 1, . . . , 63) of the noise-suppressed signals of bands of 64 groups by grouping 2 bins of the power spectrum $|Y[f, \omega]|^2$ (ω=0, 1, . . . , 127) of the noise-suppressed signal of each band as one group.

In addition, when a technique, which does not use the power spectrum of the noise-suppressed signal of the previous frame, is used for calculating the suppressing gain in the suppressing gain calculating section 306 or 309, the power spectrum calculating section 313, the switch 314, and the group integrating sections 315 and 316 may be omitted.

The inverse orthogonal transform section 319 can calculate the noise-suppressed signal y[n] in the time domain by restoring the phase spectrums θx[f, ω] (ω=0, 1, . . . , 127), which are output from the orthogonal transform section 300, to 256 points considering that the input signal for which the frequency transform has been performed by the orthogonal transform section 300 is a real signal and performing frequency inverse-transform by 256-point IFFT by the orthogonal transform unit 300 by using the amplitude spectrum |Y[f, ω]| of the noise-suppressed signal, which is output from the noise suppressing section 316, in a case where frequency transform has been performed by using 256-point FFT and performing a process for restoring the overlap by using the noise-suppressed signal y [n] of the previous frame in the time domain appropriately considering the windowing performed by the orthogonal transform section 300.

As described above, it is determined whether each frame of the input signal is an interval (the noise interval) in which a noise component as a non-target signal is dominantly included or a different interval (the speech interval), and a noise suppressing process for suppressing the non-target signal is performed for each frequency band that is coarsely grouped at a low resolution of the frequency domain, in which the noise suppressing process for suppressing the non-target signal is performed, for the noise interval, and a noise suppressing process for suppressing the non-target signal is performed for each frequency band that is finely grouped at a high resolution for the speech interval. Accordingly, by lowering the resolution of the frequency domain in the noise interval, the amount of suppression for the noise increases, and accordingly, a feeling of the noise caused by a dominant noise component is reduced, and a musical noise that is generated by increasing the resolution of the frequency domain can be reduced. In addition, by increasing the resolution of the frequency domain in the speech interval, distortion of speech that is generated by lowering the resolution of the frequency domain can be decreased.

In addition, in this embodiment, the average value of the power spectrums $|X[f, \omega]|^2$ within a group is used as a representative value in the grouping process. However, the representative value is not limited thereto and may be appropriately changed. For example, a maximum value of the power spectrums within the group may be used as the representative value, a value that is the nearest to the average value of the power spectrums within the group may be used as the representative value, or a value located on the center by rearranging the power spectrums within the group in the ascending order may be used as the representative value. Also in such a case, the same advantages are acquired. In addition, in this embodiment, the grouping process is performed for the power spectrums $|X[f, \omega]|^2$. However, the present invention is not limited thereto and may be appropriately changed. For example, a process for grouping the spectrums X [f, ω] may be performed, or a process for grouping pairs of the amplitude spectrum |X[f, ω] and the phase spectrum θx[f, ω] may be performed. Also in such a case, the same advantages are acquired. In addition, in this embodiment, the orthogonal transform is performed by using the FFT. However, also by performing a process for grouping the transform coefficients that are acquired by using a different orthogonal transform, which has been described above, for transform into the frequency domain for frequency analysis, the same advantages can be acquired.

Figure 3:
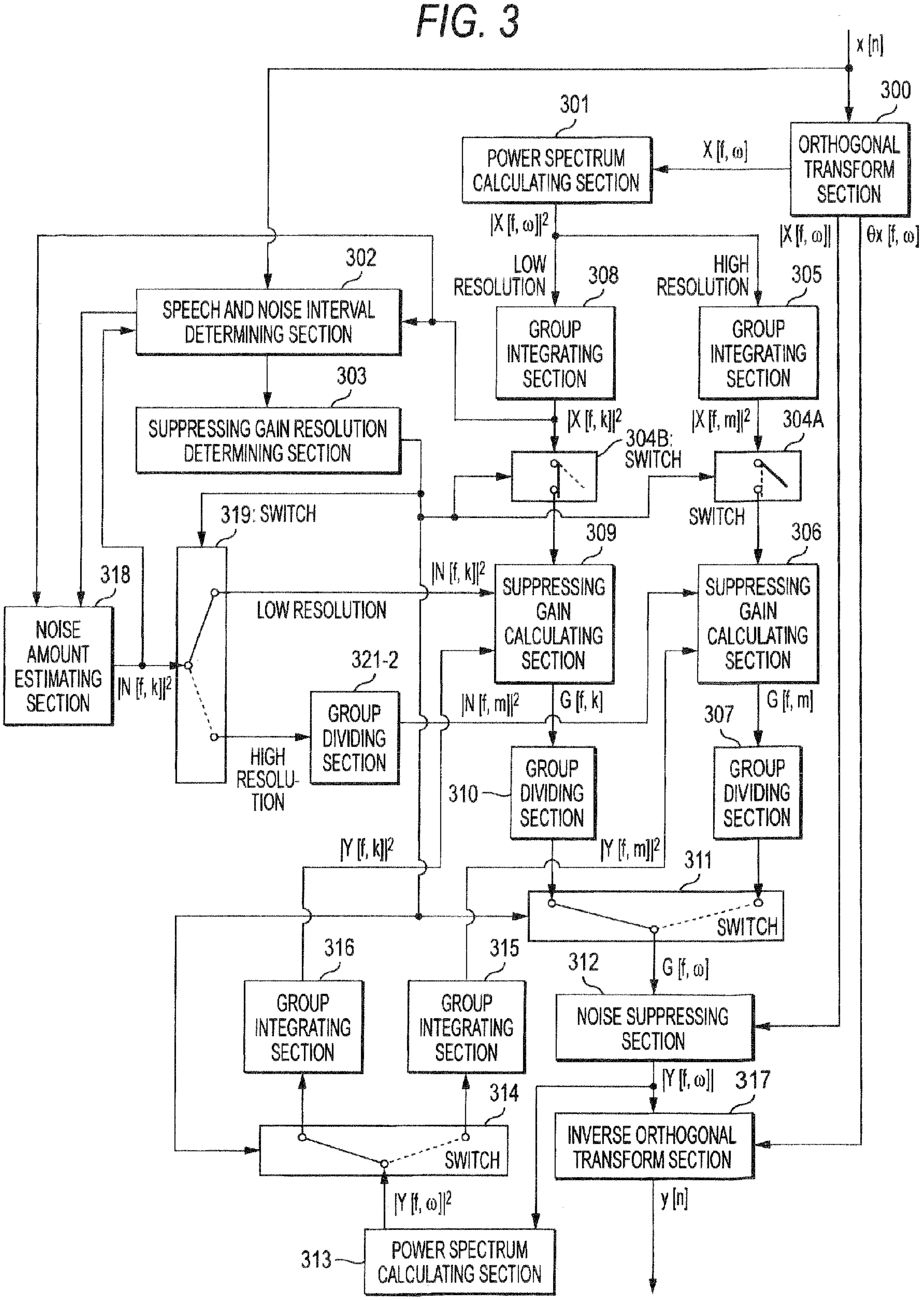
FIG. 3 is an exemplary block diagram representing a modified example of the signal correction unit of the signal correction device according to the first embodiment of the invention.
Figure 4:
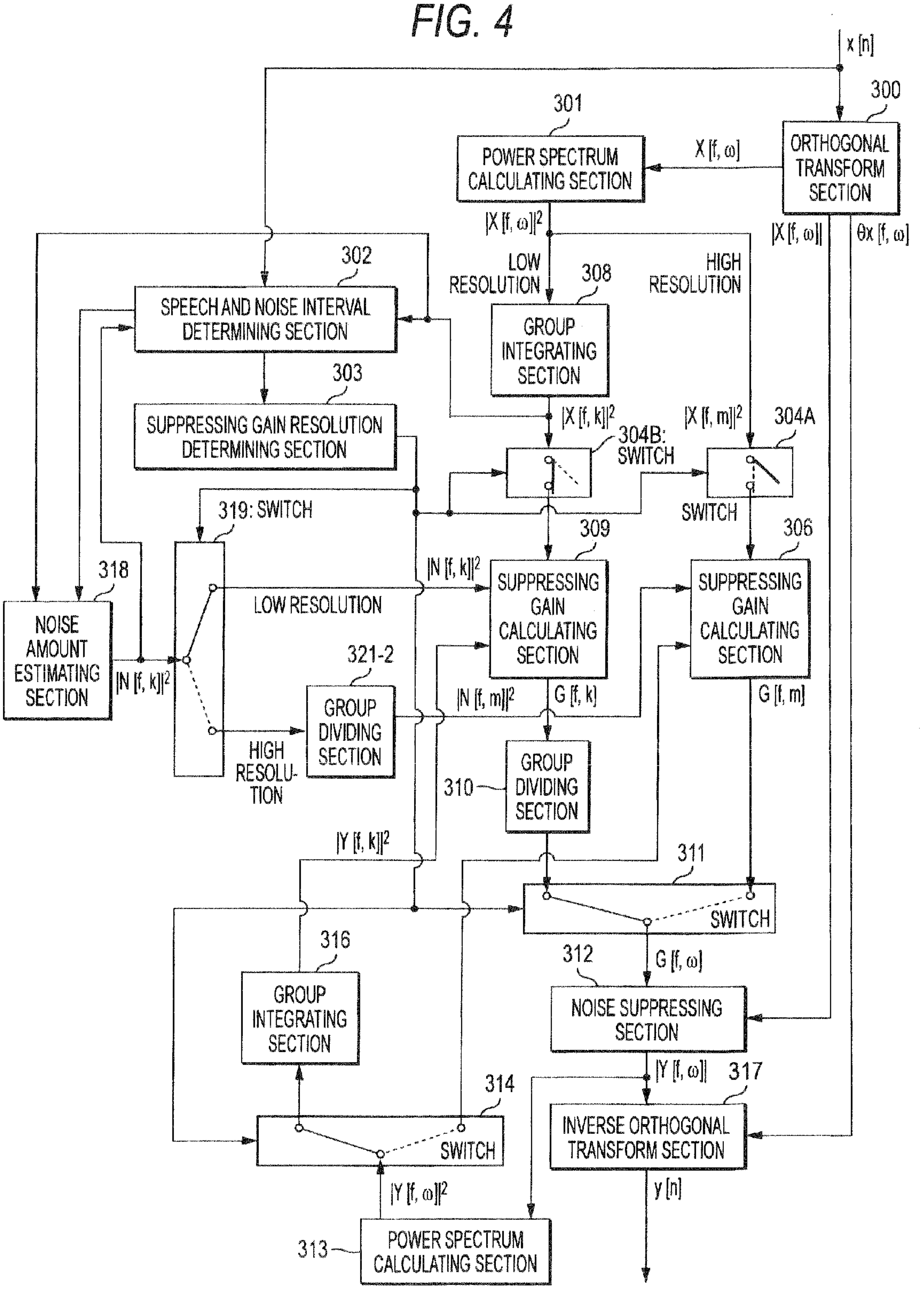
FIG. 4 is an exemplary block diagram representing a modified example of the signal correction unit of the signal correction device according to the first embodiment of the invention.

In addition, the configuration of the signal correction unit 3 that changes the resolution for the noise suppressing process depending on whether the frame is the speech interval or the noise interval is not limited to the above-described configuration and may be appropriately changed. In FIGS. 3 and 4, changed examples will be described.

In a signal correction unit 3, represented in FIG. 3, that performs a noise suppressing process, the speech and noise interval determining section 302 determines whether a frame is the speech interval or the noise interval by using the power spectrum $|X[f, k]|^2$ of the input signals that are grouped at a low resolution by using the group integrating section 308. In addition, the suppressing gain resolution determining section 303 operates either a switch 304A or a switch 304B depending on whether the frame is the speech interval or the noise interval by using the output of the speech and noise interval determining section 302, instead of shifting the switch 304. In other words, when the output of the speech and noise interval determining section 302 indicates the noise interval, the suppressing gain calculating section 309 operates in accordance with the shift of the switch 304A. On the other hand, when the output of the speech and noise interval determining section 302 indicates the speech interval, the suppressing gain calculating section 306 operates in accordance with the shift of the switch 304A. In addition, the noise amount estimating section 318 estimates the noise amount by using the information, which indicates the speech interval or the noise interval, output from the speech and noise interval determining section 302 and the power spectrum $|X[f, k]|^2$ of the input signals, which are output from the group integrating section 308, grouped for the low resolution. Accordingly, the noise amount $|N[f, k]|^2$ of each band that is output from the noise amount estimating section 318 also has a low resolution. Accordingly, when the frame is determined to be the speech interval by the speech and noise interval determining section 302 and the suppressing gain resolution determining section 303 shifts the switch 319 to the high resolution, the noise amounts $|N[f, k]|^2$ of each band that are output from the noise amount estimating section 318 are divided in accordance with the number of bins that is set to the high resolution by the group dividing section 321-2. As described above, in the signal correction unit 3 represented in FIG. 3, the resolution for estimation of the noise amount in the noise amount estimating section 318 is set to the same resolution (low resolution) as that for performing the noise suppression in the noise interval. Accordingly, the process performed by the group integrating section 320 of the signal correction unit 3 represented in FIG. 2 can be omitted, and therefore, redundancy of the process can be excluded.

In addition, in the signal correction unit 3, represented in FIG. 4, that performs the noise suppressing process, the resolution for the suppressing gain calculating process (the high-resolution noise suppressing process) for suppressing the noise in the speech interval is additionally configured to be the same as that for the orthogonal transform performed by the orthogonal transform section 300, which is different from the signal correction unit 3, represented in FIG. 3, that performs the noise suppressing process. For example, this is the case where the suppressing gain calculating process for noise suppression is performed by using the power spectrums $|X[f, k]|^2$ that are integrated so as to form the number of groups that is smaller (for example, 16) than 128 by the group integrating section 308 for a case where the target frame of the input signal is determined to be the noise interval when the orthogonal transform is performed, for example, by using 256-point FFT by the orthogonal transform section 300. On the other hand, in the above-described case, the suppressing gain calculating process for noise suppression in each band (128 points) acquired by the orthogonal transform section 300 is performed for a case where the target frame of the input signal is determined to be the speech interval. As described above, since the resolution for the suppressing gain calculating process for noise suppression for the input interval is the same as the resolution of the orthogonal transform performed by the orthogonal transform section 300, grouping (the group integrating section 305 of the signal correction unit 3 represented in FIG. 3) for performing the suppressing gain calculating process for noise suppression in the noise interval at a high resolution is not needed. In addition, since group integration is not performed for the speech interval, the group dividing process (the group dividing section 307 of the signal correction unit 3 represented in FIG. 3) and the group integrating process (the group integrating section 315 of the signal correction unit 3 represented in FIG. 3) for the power spectrums $|Y[f, \omega]|^2$ of the noise-suppressed signals are not needed for a case where the suppressing gain calculating process for noise suppression in the speech signal is performed at a high resolution Accordingly, the redundancy of the process can be excluded.

As described above, even in the cases exemplified in FIGS. 2 to 4, it is determined whether each frame of the input signal is an interval (the noise interval) in which a noise component as a non-target signal is dominantly included or a different interval (the speech interval), and the resolution of the frequency domain for performing the noise suppressing process for suppressing the non-target signal is changed depending on whether the frame is the speech interval or the noise interval. Accordingly, by reducing the musical noise that irritates the nose in the noise interval with a light computational load, the distortion of the speech in the speech interval can be reduced.

Second Embodiment

Figure 5:
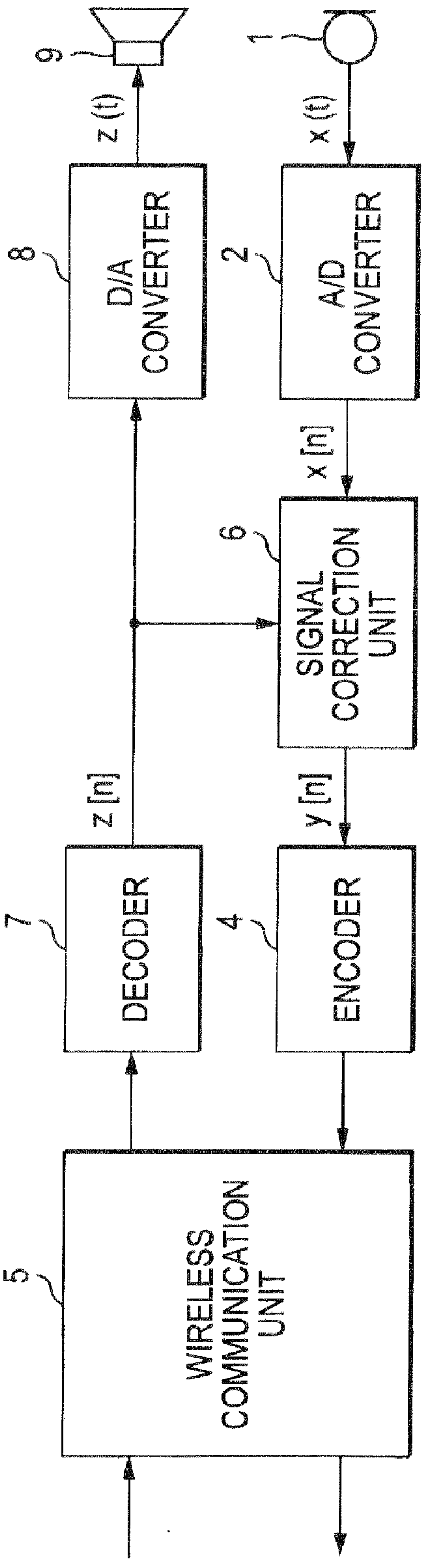
FIG. 5 is an exemplary block diagram representing configuration of a transmitter/receiver of a wireless communication device of a cellular phone in which a signal correction device according to a second embodiment of the invention is used.

FIG. 5 represents the configuration of a transmitter/receiver of a wireless communication device of a cellular phone in which a signal correction device according to the second embodiment is used. The wireless communication device represented in this figure includes a microphone 1, an A/D converter 2, a signal correction unit 6, an encoder 4, a wireless communication unit 5, a decoder 7, a D/A converter 8, and a speaker 9.

The microphone 1 collects surrounding sound and outputs the collected sound as an analog signal x(t). At this moment, other than a speech signal s(t) as a target sound, a noise component that is a surrounding noise or an unnecessary non-target signal such as an echo component due to a reception signal z(t), which is output from the decoder 7 to be described later, other than the target signal is mixed with the speech signal so as to be also collected as the signal x(t) from the microphone 1. The A/D converter 2 performs A/D conversion for the analog signal x(t), which is output from the microphone 1, for each predetermined processing unit with the sampling frequency set to 8 kHz and outputs digital signals x[n] for each one frame (N samples) Hereinafter, it is assumed that one frame is formed of samples of N=160. The signal correction unit 6 corrects the input signal x[n] such that only a target signal is enhanced or a non-target signal is suppressed by using a reception signal z[n] that is output from the decoder 7 to be described later and outputs a signal y[n]

after correction. For example, in such a case, an echo suppressing process and a noise suppressing process for the input signal may be regarded as the correction process. The encoder 4 encodes the signal y [n] after correction that is output from the signal correction unit 6 and outputs the encoded signal to the wireless communication unit 5. The wireless communication unit 5 includes an antenna and the like. By performing wireless communication with a wireless base station not shown in the figure, the wireless communication unit 5 sets up a communication link between a communication counterpart and the wireless communication device through a mobile communication network for communication and transmits the signal that is output from the encoder 4 to the communication counterpart. In addition, the reception signal that is received from the wireless base station is input to the decoder 7. The decoder 7 outputs a received signal z[n] that is acquired by decoding the input reception signal. The D/A converter 8 converts the received signal z[n] into an analog received signal z(t) and outputs the received signal z(t) from the speaker 9. In addition, the frequency used in the decoder 7 and the D/A converter 8 is also 8 kHz.

In addition, here, a configuration in which the signal that is output from the encoder 4 is described to be transmitted by the wireless communication unit 5. However, a configuration in which memory means configured by a memory, a hard disk, or the like is arranged, and the signal output from the encoder 4 is stored in the memory means may be used. In addition, here, the signal output from the decoder 7 is described to be received by the wireless communication unit 5. However, a configuration in which memory means that is configured by a memory, a hard disk, or the like is arranged, and a signal stored in the memory section is output from the decoder 7 may be used.

Figure 6:
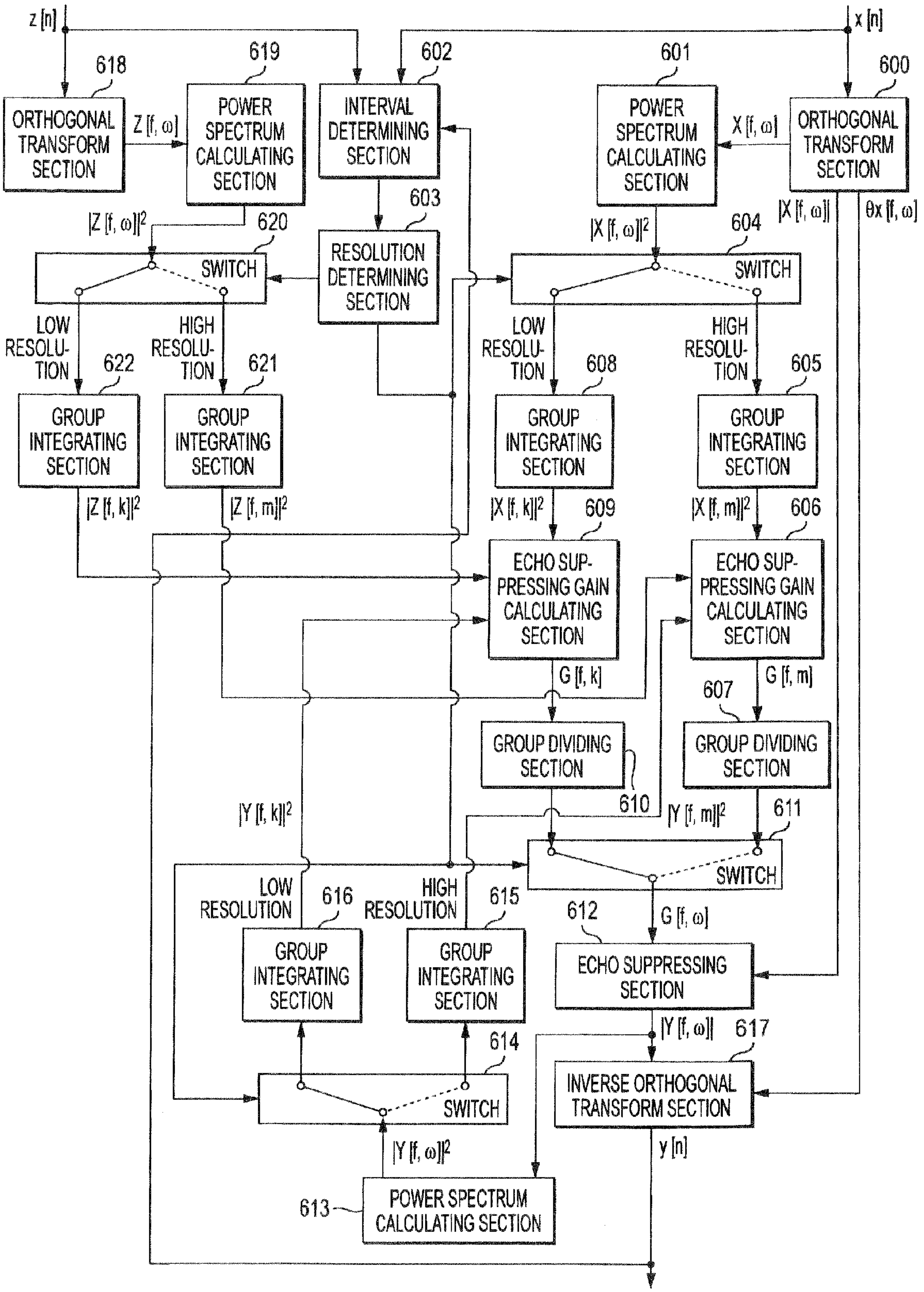
FIG. 6 is an exemplary block diagram representing the configuration of a signal correction unit of the signal correction device according to the second embodiment of the invention.

Next, the signal correction unit 6 will be described. The signal correction unit 6 according to this embodiment is described to perform an echo suppressing process. The signal correction unit 6 receives a digitalized transmitted signal x[n] and the received signal z[n] as input and outputs a transmitted signal y[n] after echo suppression. FIG. 6 is a block diagram representing the configuration of the signal correction unit 6 that performs the echo suppressing process.

An orthogonal transform section 600, similarly to the orthogonal transform section 300 according to the first embodiment, extracts signals corresponding to samples needed for orthogonal transform from an input signal during a previous frame and the input signal x[n] during the current frame f by appropriately performing zero padding or the like and performs windowing for the extracted signals by using a hamming window or the like. Then, the orthogonal transform section 600 performs orthogonal transform for the input signal x [n] by using a technique such as FFT. Here, as an example, by setting the number of samples of the overlap with the next frame to M=48, 256 samples are prepared from M samples of the input signal during the previous frame, N=160 samples of the input signal x[n] during the current frame, and zero paddings corresponding to M samples. The windowing for the 256 samples is performed by multiplying x[n] by a window function w[n] by using a sine window represented in Expression 1, and the orthogonal transform section 600performs orthogonal transform by using FFT. Then, the orthogonal transform section 600 outputs the frequency spectrum X[f, ω] (ω=0, 1, . . . , 127), the amplitude spectrum |X[f, ω]|(ω=0, 1, . . . , 127), and the phase spectrum θx[f, ω] (ω=0, 1, . . . , 127).

The orthogonal transform section 618, similarly to the orthogonal conversion section 600, performs orthogonal transform for the received signal z[n] and outputs the frequency spectrum Z[f, ω] of the reception signal.

A power spectrum calculating section 601, similarly to the power spectrum calculating section 301 of the first embodiment, calculates the power spectrum $|X[f, \omega]|^2$ (ω=0, 1, . . . , 127) from the frequency spectrum X[f, ω] that is output from the orthogonal transform section 600 and outputs the calculated power spectrum.

A power spectrum calculating section 619, similarly to the power spectrum calculating section 601, calculates the power spectrum $|Z[f, \omega]|^2$ (ω=0, 1, . . . , 127) from the frequency spectrum Z[f, ω] that is output from the orthogonal transform section 618 and outputs the calculated power spectrum.

An interval determining section 602 determines whether an input signal x[n] for each one input frame is an interval (echo dominant interval) in which an echo component as a non-target signal is dominantly included or a different interval, that is, an interval (an echo non-dominant interval) in which a speech signal as a target signal and an echo component as a non-target signal are mixed together. Then, the interval determining section 602 outputs information indicating the result of the determination. To the interval determining section 602, the input signal x[n] , the received signal z[n], and the signal after echo suppression y[n] are input. Then, the interval determining section 603 calculates the power value or the peak value (hereinafter, referred to as a power characteristic) Px[n] of the input signal x[n], the power characteristic Pz[n] of the received signal z[n], and the power characteristic Py[n] of the signal after echo suppression y[n]. First, the interval determining section 602 determines that the received signal Z[n] exists for the case of $Pz[n]>\gamma$. Then, when the receiving speech signal z[n] is determined to exist and $Py[n]>\lambda[n]\cdot Pz[n]$ or $Px[n]>\delta\cdot Pz[n]$ , the interval determining section 602 determines a double-talk state. Next, when the received signal z[n] is determined to exist and the state is not determined to be in the double-talk state (a single talk state on the received path), the frame is determined to be the echo dominant interval. Here, λ[n] is an estimated value of the echo path loss, and γ and δ are fixed values that can be externally set at the time of start of the operation. Then, the interval determining section 602 outputs information indicating whether the frame is the echo dominant interval. In other words, the echo dominant interval becomes an interval in the single talk state of the received path, and the echo non-dominant interval becomes an interval in the single talk state of the transmitted path.

The resolution determining section 603 controls switches 604, 611, 614, and 620 such that the resolution for the frame determined to be the echo dominant interval is relatively high, and the resolution for the frame determined not to be the echo dominant interval (echo non-dominant interval) is relatively low by using the information, which is output from the interval determining section 602, indicating whether the frame is the echo dominant interval. In other words, the switches 604, 611, 614, and 620 are controlled to operate in association with one another by the resolution determining section 603. When the output of the interval determining section 602 indicates the echo dominant interval, a group integrating section 608 operates in accordance with the shift of the switch 604, a group dividing section 610 operates in accordance with the shift of the switch 611, a group integrating section 616 operates in accordance with the shift of the switch 614, and a group integrating section 622 operates in accordance with the shift of the switch 620. On the other hand, when the output of the interval determining section 602 indicates the echo non-dominant interval, a group integrating section 605 operates in accordance with the shift of the switch 604, a group dividing section 607 operates in accordance with the shift of the switch 611, a group integrating section 615 operates in accordance with the shift of the switch 614, and a group integrating section 621 operates in accordance with the shift of the switch 620.

Either the group integrating section 605 or the group integrating section 608 operates in accordance with the shift of the switch 604. Both the group integrating sections 605 and 608 perform a process for binding the power spectrums $|X[f, \omega]|^2$ of the input signals, which are output from the power spectrum calculating section 601, such that one group is formed for each of the frequency bins corresponding to a predetermined number. However, the number of bins included in one group is relatively small in the group integrating section 605, and thus, the group integrating section 605 performs a high-resolution integration process for generating many groups. On the other hand, the number of bins included in one group is relatively large in the group integrating section 608, and thus, the group integrating section 608 performs a low-resolution integration process for generating fewer groups. These integration processes are the same as those performed by the group integrating sections 305 and 308 described in the signal correction device that performs the noise suppressing process represented in FIG. 1, and thus, a detailed description thereof is omitted here. In examples described below, the number of bins that are grouped into one group is fixed. However, the number of bins that are grouped into one group may be configured to be changed depending on the frequency by using the Bark scale or the like, so that the number of bins grouped into one group is relatively small in a lower range, and the number of bins grouped into one group is relatively large in a higher range.

Either the group integrating section 621 or the group integrating section 622 operates in accordance with the shift of the switch 620. Both the group integrating sections 621 and 622 perform a process for binding the power spectrums $|Z[f, \omega]|^2$ of the input signals, which are output from the power spectrum calculating section 619, such that one group is formed for each of the frequency bins corresponding to a predetermined number. However, the number of bins included in one group is relatively small in the group integrating section 621, and thus, the group integrating section 621 performs a high-resolution integration process for generating many groups.

On the other hand, the number of bins included in one group is relatively large in the group integrating section 622, and thus, the group integrating section 622 performs a low-resolution integration process for generating fewer groups. These integration processes are the same as those performed by the group integrating sections 605 and 608, and thus, a detailed description thereof is omitted here.

Both an echo suppressing gain calculating section 606 and an echo suppressing gain calculating section 609 calculate suppressing gains that are used for a process for suppressing the echo from the input signals. At a time, either the echo suppressing gain calculating section 606 or the echo suppressing gain calculating section 609 operates. Since the processes performed by the echo suppressing gain calculating sections 606 and 609 are the same, the echo suppressing gain calculating section 606 will be described in detail, and a description of the echo suppressing gain calculating section 609 will be omitted here.

Figure 7:
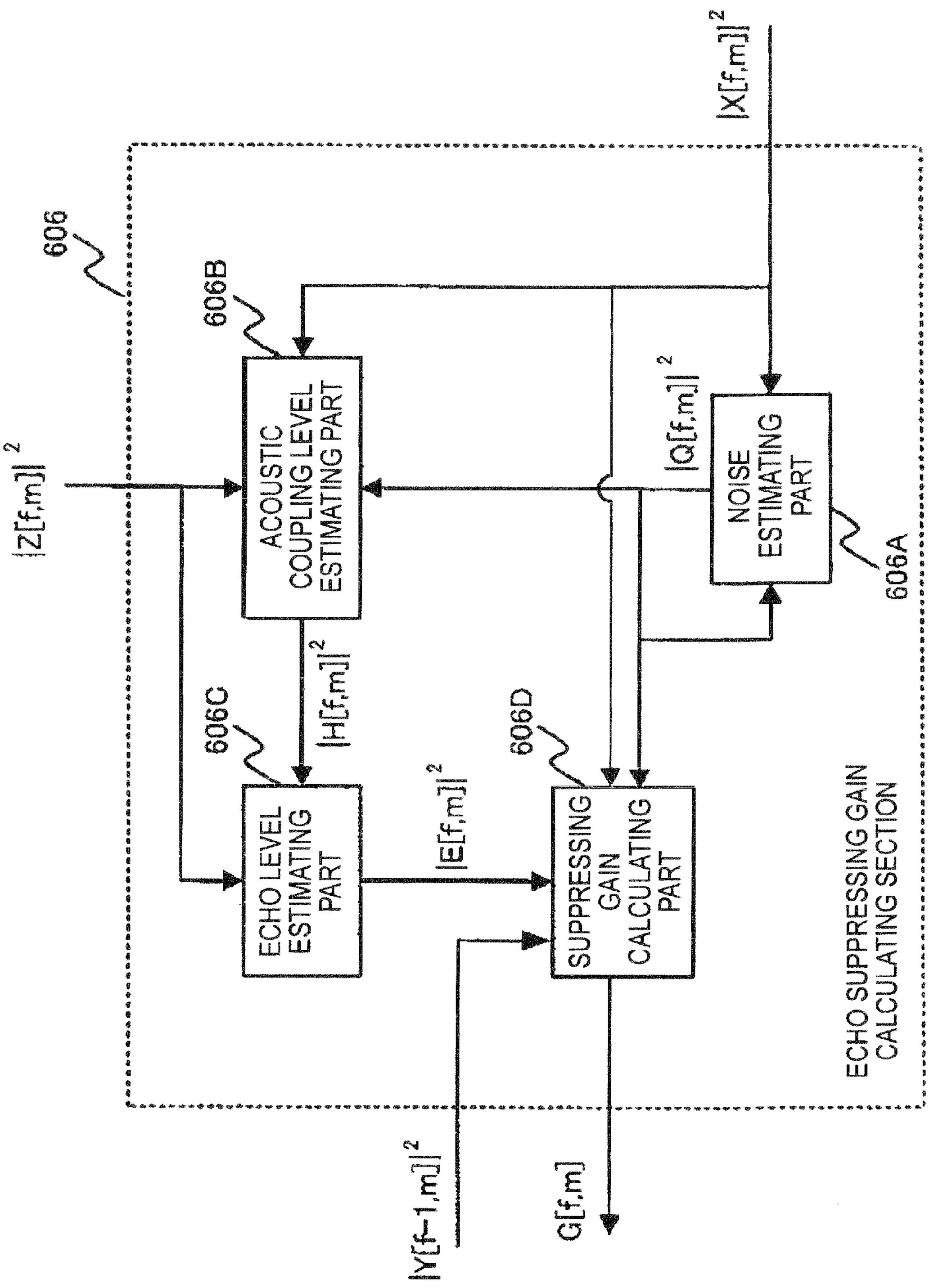
FIG. 7 is an exemplary block diagram representing configuration of an echo suppressing section of the signal correction device according to the second embodiment of the invention.

The echo suppressing gain calculating section 606, as represented in FIG. 7, is configured by a noise estimating part 606A, an acoustic coupling level estimating part 606B, an echo level estimating part 606C, and a suppressing gain calculating part 606D. To the echo suppressing gain calculating section 606, the power spectrum $|X[f, m]|^2$ of the input signals grouped for a high resolution and the power spectrum $|Z[f, m]|^2$ of the received signals grouped for a high resolution are input.

The noise estimating part 606A calculates the frequency noise level $|Q[f, m]|^2$ for each grouped frequency bins. The frequency noise level $|Q[f, m]|^2$ is calculated as follows by smoothing the power spectrum $|X[f, m]|^2$ of the input signals while being attenuated. At this moment, the frequency noise level $|Q[f-1, m]|^2$ of the previous frame is used. In addition, $\beta_{Q1}[\omega]$ and $\beta_{Q2}[\omega]$ are predetermined values that are equal to or more than "0" and equal to or less than "1". For example, $\beta_{Q1}[\omega]=0.001$, $\beta_{Q2}[\omega]=0.2$, and the like.

$$|Q[f,m]|^2=\beta_{Q1}[\omega]\cdot|X[f,m]|^2+(1-\beta_{Q1}[\omega])\cdot|Q[f-1,m]|^2 \quad (|X[f,m]|^2 \geqq |Q[f-1,m]|^2)$$

$$|Q[f,m]|^2=\beta_{Q2}[\omega]\cdot|X[f,m]|^2+(1-\beta_{Q2}[\omega])\cdot|Q[f-1,m]|^2 \quad (|X[f,m]|^2 < |Q[f-1,m]|^2) \qquad \text{[Expression 6]}$$

To the acoustic coupling level estimating part 606B, the power spectrum $|X[f, m]|^2$ of the input signals, the power spectrum $|Z[f, m]|^2$ of the received signals, and the frequency noise level $|Q[f, m]|^2$ that is output from the noise estimating part 606A are input. The acoustic coupling level estimating part 606B calculates the acoustic coupling level $|H[f, m]|^2$ as an estimated value of the echo path characteristic as follows by using the above-described power spectrums.

$$|H[f,m]|^2 = \frac{|X[f,m]|^2 - |Q[f,m]|^2}{|Z[f,m]|^2} \qquad \text{[Expression 7]}$$

However, when the acoustic coupling level $|H[f, m]|^2$ abruptly changes from the acoustic coupling level $|H[f-1, m]|^2$ of the previous frame (when the condition of ($|H[f, m]|^2>\beta_H[\omega]\cdot|H[f-1, m]|^2$ is satisfied; here, $\beta_H[\omega]$ is a predetermined value) or when the received signal is not sufficient large (when the condition of $|Z[f, m]|^2<\beta_X[\omega]$ is satisfied; here, $\beta_X[\omega]$ is a predetermined value), in order not to calculate the acoustic coupling level of the frequency band in which double talk can be made, the acoustic coupling level is not updated, and the value of the acoustic coupling level $|H[f-1, m]|^2$ of the previous frame is used as the acoustic coupling level $|H[f, m]|^2$. The acoustic coupling level estimating part 606B outputs the acoustic coupling level $|H[f, m]|^2$ calculated as above to the echo level estimating part 606C.

To the echo level estimating part 606C, the power spectrum $|Z[f, m]|^2$ of the received signal and the acoustic coupling level $|H[f, m]|^2$ output from the acoustic coupling level estimating part 606B are input. The echo level estimating part 606C calculates the estimated echo level $|E[f, m]|^2$ as below by using values thereof and outputs the calculated estimated echo level to the suppressing gain calculating part 606D.

$$|E[f,m]|^2=|H[f,m]|^2\cdot|Z[f,m]|^2 \qquad \text{[Expression 8]}$$

To the suppressing gain calculating part 606D, the power spectrum $|X[f, m]|^2$ of the input signals, the estimated echo level $|E[f, m]|^2$ output from the echo level estimating part 606C, the frequency noise level $|Q[f, m]|^2$ output from the noise estimating part 60GA, and the power spectrum $|Y[f-1, m]|^2$ of echo-suppressed output signals of the previous frame that is output from the group integrating section 615 to be described later are input. For example, the calculation of the suppressing gain G[f, m] in the suppressing gain calculating part 606D is performed by using one of the following algorithms or a combination thereof. In other words, a spectral subtraction method (S. F. Boll, "Suppression of acoustic noise in speech using spectral subtraction", IEEE Trans. Acoustics, Speech, and Signal Processing, vol. ASSP-29, pp. 113-120, 1979.) that is used in a general noise canceller, a Wiener Filter method (J. S. Lim. A. V. Oppenheim, "Enhancement and bandwidth compression of noisy speech", Proc. IEEE Vol. 67. No. 12, pp. 1586-1604, December 1979.), a maximum likelihood method (R. J. McAulay, M. L. Malpass, "Speech enhancement using a soft-decision noise suppression filter", IEEE Trans. on Acoustics, Speech, and Signal Processing, vol. ASSP-28, no. 2. pp. 137-145, April 1980.), or the like may be used. Here, as an example, the Wiener Filter method is used. In addition, by denoting R [·] as half-wave rectification and using the power spectrum $|Y[f-1, m]|^2$ of the echo-suppressed signal of the previous frame that is output from a group integrating section 615 to be described later, the $SNR_{PRIO}[f, m]$ with respect to the prior-SNR and the $SNR_{POST}[f, m]$ with respect to the post-SNR are acquired by using the following Expression 9 and Expression 10, and the suppressing gain G[f, m] is calculated by using the following Expression 11. Here, μ[m] is a leakage coefficient in the range of about 0.9 to 0.999.

$$SNR_{POST}[f, m] = \frac{|X[f, m]|^2}{|E[f, m]|^2} \quad \text{[Expression 9]}$$

$$SNR_{PRIO}[f, m] = (1 - \mu[m]) \cdot R[SNR_{POST}[f, m] - 1] + \mu[m] \cdot \frac{|Y[f-1, m]|^2}{|E[f, m]|^2} \quad \text{[Expression 10]}$$

$$G[f, m] = \frac{SNR_{PRIO}[f, m]}{SNR_{PRIO}[f, m] + 1} \quad \text{[Expression 11]}$$

As another example, the suppressing gain calculating part 606D may be configured to calculate the echo suppressing gain G[f, m] as below. Here, $\gamma_G[\omega]$ represented in Expression 12 is a predetermined parameter value that is set in advance In such a case, since the power spectrum $|Y[f-1, m]|^2$ of the echo-suppressed signal of the previous frame is not used, the power spectrum calculating section 613, the switch 614, and the group integrating sections 615 and 616 may be omitted.

$$G[f, m] = 1 - \gamma_G[\omega] \cdot \frac{|E[f, m]|^2}{|X[f, m]|^2} \quad \text{[Expression 12]}$$

In addition, there are cases where echo suppression is performed excessively relative to the noise level depending on the value of the echo suppressing gain G[f, m]. Thus, the value of the echo suppressing gain G[f, m] is controlled not to be smaller than $G_{FLOOR}[f, m]$ represented in Expression 13.

$$G_{FLOOR}[f, m] = \frac{|Q[f, m]|^2}{|X[f, m]|^2} \quad \text{[Expression 13]}$$

The echo suppressing gain G[f, m] calculated as above is output to the group integrating section 607.

Now, the description will be made with reference back to FIG. 6. The group dividing sections 607 and 610 restore the frequency bins that have been grouped by the group integrating section 605 or the group integrating section 608 to the number of bins before being grouped. For example, in a case where 16 groups are generated by grouping 128 bins into groups of 8 bins by using the low-resolution group integrating section 608, the group dividing section 610 copies 8 samples of the suppressing gains G[f, k], which are output from the suppressing gain calculating section 609, within a same group and divides grouping of 16 groups, whereby generating suppressing gains G[f, ω] corresponding to 128 bins. The high-resolution group dividing section 607 also can acquire the suppressing gains G[f, ω] that are restored to the number of bins before being grouped by performing the same process as that of the low-resolution group dividing section 610. Accordingly, the suppressing gain G [f, ω] , which has been output by the group dividing section 607 or 610, is input to the noise suppressing section 612 through the switch 611.

The echo suppressing section 612 receives the amplitude spectrum |X[f, ω]| of the input signals and the echo suppressing gain G[f, ω] that is output through the switch 611 as input and outputs the frequency spectrum Y[f, ω] of the echo-suppressed input signals to the inverse orthogonal transform section 617 as below.

$$Y[f,\omega]=G[f,\omega]\cdot Z[f,\omega] \quad \text{[Expression 14]}$$

A power spectrum calculating section 613 calculates the power spectrum $|Y[f, \omega]|^2$ (ω=0, 1, . . . , 127) of the echo-suppressed signal from the amplitude spectrum |Y[f, ω]| of the echo-suppressed signal that is output from the echo suppressing section 612 and outputs the power spectrum $|Y[f, \omega]|^2$.

Either the group integrating section 615 or the group integrating section 616 operates in accordance with the shift of the switch 614. Both the group integrating sections 615 and 616 perform a process for grouping the power spectrums $|Y[f, \omega]|^2$ of the noise-suppressed signals, which are output from the power spectrum calculating section 613, into one group for each of the frequency bins corresponding to a predetermined number. However, the number of frequency bins grouped into one group by the group integrating section 615 is different from that grouped into one group by the group integrating section 616. The group integrating section 616 groups each of bins, the number of which is the same as that in the group integrating section 608 that integrates the power spectrums of the input signals, with a low resolution. On the other hand, the group integrating section 615 groups each of bins, the number of which is the same as that in the group integrating section 605 that integrates the power spectrums of the input signals, with a high resolution. For example, the group integrating section 616 calculates the power spectrums $|Y[f, k]|^2$ (k=0, 1, . . . , 15) of the echo-suppressed signals of bands of 16 groups by grouping the power spectrums $|Y[f, \omega]|^2$ (ω=0, 1, . . . , 127) of the echo-suppressed signals of each band for every 8 bins. On the other hand, the group integrating section 615 outputs the power spectrums $|Y[f, m]|^2$ (m=0, 1, . . . , 63) of the echo-suppressed signals of bands of 64 groups by grouping 2 bins of the power spectrum $|Y[f, \mathbf{107}]|^2$ (ω=0, 1, . . . , 127) of the echo-suppressed signal of each band as one group.

The inverse orthogonal transform section 617 can calculate the noise-suppressed signal y[n] in the time domain by restoring the phase spectrums θx[f, ω] (ω=0, 1, . . . , 127), which are output from the orthogonal transform section 600, to 256 points considering that the input signal for which the frequency transform has been performed by the orthogonal transform section 600 is a real signal and performing frequency inverse-transform by 256-point IFFT by the orthogonal transform section 600 by using the amplitude spectrum |Y[f, ω] of the echo-suppressed signal, which is output from the echo suppressing section 612, in a case where frequency transform has been performed by using 256-point FFT and performing a process for restoring the overlap by using the echo-suppressed signal y[n] of the previous frame in the time domain appropriately considering the windowing performed by the orthogonal transform section 600.

As described above, it is determined whether each frame of the input signal is an interval (the echo dominant interval) in which an echo component as a non-target signal is dominantly included or a different interval (the echo non-dominant interval), and an echo suppressing process for suppressing the non-target signal is performed for each frequency band that is coarsely grouped at a low resolution of the frequency domain, in which the echo suppressing process for suppressing the non-target signal is performed, for the echo dominant interval, and an echo suppressing process for suppressing the non-target signal is performed for each frequency band that is finely grouped at a high resolution for the echo non-dominant interval. Accordingly, in the echo dominant interval that is in a single talk state of the received path, the musical noise that is generated by increasing the resolution of the frequency domain can be reduced. In addition, in the echo non-dominant interval that is in the double talk state or a single talk state of the transmitted path, distortion of speech that is generated by decreasing the resolution of the frequency domain can be decreased.

In addition, in the signal correction unit of the signal correction device represented as the second embodiment, the same changes as those in the modified examples of the signal correction unit of the signal correction device according to the first embodiment can be made.

For example, when the frequency resolution (high resolution) at the time of performing echo suppression for the input signal in the echo non-dominant interval is configured to be the same as the resolution at the time of the orthogonal transform performed by the orthogonal transform section 600, the group integrating section 605 or the group dividing section 607 can be omitted.

The invention is not limited to the above-described embodiments and may be appropriately changed within the scope not departing from the basic idea of the invention.

What is claimed is:

1. A signal correction device comprising:

an orthogonal transform section configured to perform an orthogonal transform for an input signal, the input signal including speech as a target signal and an unnecessary non-target signal other than the speech;

an interval determining section configured to determine whether each frame of the input signal is an interval in which the non-target signal is dominantly included to classify the frame into being the interval or not being the interval;

a suppressing gain calculating section configured to calculate suppressing gain for suppressing the non-target signal for each first frequency bandwidth at a first frequency resolution for a frame determined to be the interval, and to calculate suppressing gain for suppressing the non-target signal for each second frequency bandwidth at a second frequency resolution for a frame determined not to be the interval, the second frequency resolution being higher than the first frequency resolution; and a signal correcting section configured to perform a signal correcting process for suppressing the non-target signal for a transform coefficient that is acquired by the orthogonal transform section by using the suppressing gain that is calculated by the suppressing gain calculating section.

2. A signal correction device comprising:

an orthogonal transform section configured to perform an orthogonal transform for an input signal, the input signal including speech as a target signal and an unnecessary non-target signal other than the speech;

an interval determining section configured to determine whether each frame of the input signal is an interval in which the non-target signal is dominantly included to classify the frame into being the interval or not being the interval;

a suppressing gain calculating section configured to divide transform coefficients acquired from the orthogonal transform section into groups of a first group number and to calculate suppressing gain for suppressing the non-target signal for each of the groups of the first group number for a frame determined to be the interval, and configured to divide the transform coefficients into groups of a second group number that is larger than the first group number and to calculate suppressing gain for suppressing the non-target signal for each of the groups of the second group number for the frame determined not to be the interval; and a signal correcting section configured to perform a signal correcting process for suppressing the non-target signal for a transform coefficient that is acquired by the orthogonal transform section by using the suppressing gain that is calculated by the suppressing gain calculating section.

3. The signal correction device according to claim 2, wherein the suppressing gain calculating section calculates representative values of the transform coefficients within the groups for each of a plurality of the groups and calculates suppressing gains for each of the plurality of the groups based on the representative values of the transform coefficients.

4. The signal correction device according to claim 2, wherein the suppressing gain calculating section configures the transform coefficients acquired by the orthogonal transform section as power spectra, wherein the suppressing gain calculating section divides the power spectra into groups of the first group number, calculates representative values of the power spectra within the groups of the first group number for each group, and calculates suppressing gains based on the representative values for the frame determined to be the interval, and wherein the suppressing gain calculating section divides the power spectra into groups of the second group number that is larger than the first group number, calculates representative values of the power spectra within the groups of the second group number for each group, and calculates the suppressing gains based on the representative values for the frame determined not to be the interval.

5. The signal correction device according to claim 3, wherein each of the representative values of the transform coefficients is an average value.

6. The signal correction device according to claim 4, wherein each of the representative values of the transform coefficients is an average value.

7. The signal correction device according to claim 2, wherein the number of the transform coefficients divided into groups within the groups of the first group number or the second group number is constant for each of the groups.

8. The signal correction device according to claim 3, wherein the number of the transform coefficients divided into groups within the groups of the first group number or the second group number is constant for each of the groups.

9. The signal correction device according to claim 4, wherein the number of the transform coefficients divided into groups within the groups of the first group number or the second group number is constant for each of the groups.

10. The signal correction device according to claim 5, wherein the number of the transform coefficients divided into groups within the groups of the first group number or the second group number is constant for each of the groups.

11. The signal correction device according to claim 6, wherein the number of the transform coefficients divided into groups within the groups of the first group number or the second group number is constant for each of the groups.

12. The signal correction device according to claim 2, wherein the number of the transform coefficients within each of the groups of the second group number is one.

13. The signal correction device according to claim 3, wherein the number of the transform coefficients within each of the groups of the second group number is one.

14. The signal correction device according to claim 4, wherein the number of the transform coefficients within each of the groups of the second group number is one.

15. The signal correction device according to claim 5, wherein the number of the transform coefficients within each of the groups of the second group number is one.

16. The signal correction device according to claim 6, wherein the number of the transform coefficients within each of the groups of the second group number is one.

17. The signal correction device according to claim 1, wherein the signal correcting process includes a process of suppressing a noise for the input signal, and wherein the interval determining section determines whether each frame of the input signal is an interval in which a noise component is dominantly included.

18. The signal correction device according to claim 2, wherein the signal correcting process includes a process of suppressing a noise for the input signal, and wherein the interval determining section determines whether each frame of the input signal is an interval in which a noise component is dominantly included.

19. The signal correction device according to claim 1, wherein the signal correcting process includes a process of suppressing an echo for the input signal, and wherein the interval determining section determines whether each frame of the input signal is an interval in which an echo component is dominantly included.

20. The signal correction device according to claim 2, wherein the signal correcting process includes a process of suppressing an echo for the input signal, and wherein the interval determining section determines whether each frame of the input signal is an interval in which an echo component is dominantly included.

* * * * *